G. Burnham,
Rotary Steam Valve.
N° 30,176. Patented Sep. 25, 1860.

Witnesses:
Walter Whitfield
Thomas H. Walsh

Inventor:
George Burnham

N. PETERS, PHOTO-LITHOGRAPHER, WASHINGTON, D. C.

UNITED STATES PATENT OFFICE.

GEORGE BURNHAM, OF PITTSBURG, PENNSYLVANIA, ASSIGNOR TO HIMSELF, W. D. RINEHART, AND C. A. NAUMAN, OF SAME PLACE.

OSCILLATING VALVE FOR STEAM-ENGINES.

Specification of Letters Patent No. 30,176, dated September 25, 1860.

*To all whom it may concern:*

Be it known that I, GEORGE BURNHAM, of Pittsburg, in the county of Allegheny and State of Pennsylvania, have invented a new and useful Improvement in Valves for Steam-Engines; and I do hereby declare the following to be a full, clear, and exact description thereof, reference being had to the annexed drawing, forming part of this specification, in which—

Figure 3:
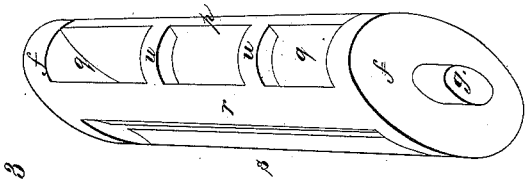
Figure 2:
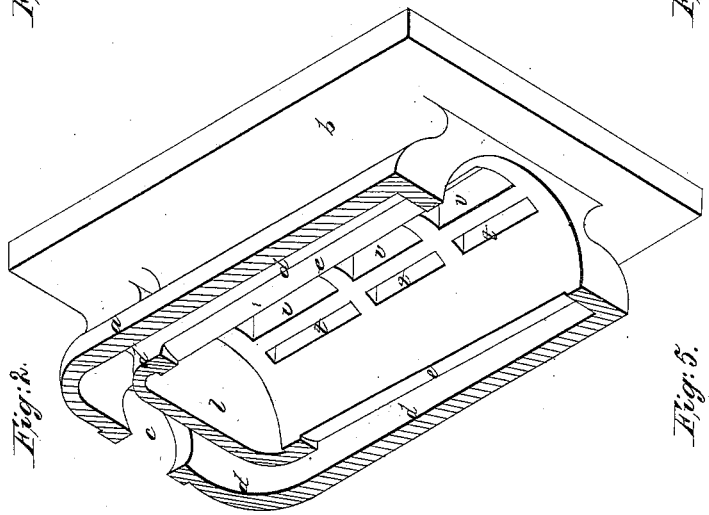
Figure 6:
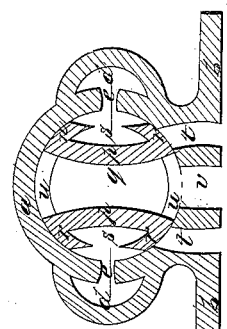
Figure 5:
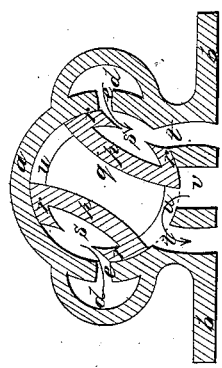
Figure 1:
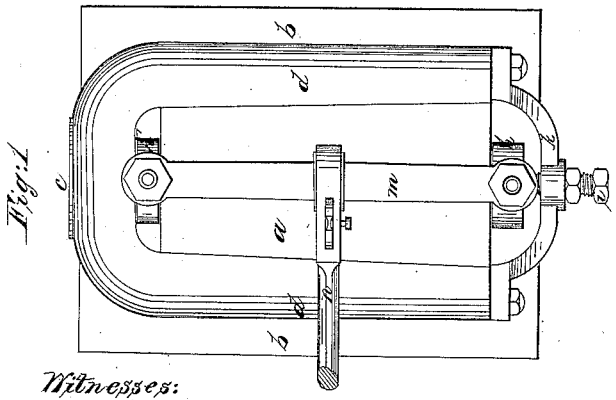
Figure 4:
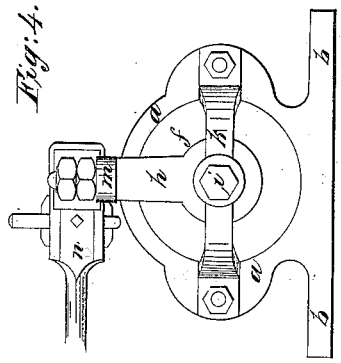

Figure 1 is a plan or top view of my improved valve showing its exterior appearance. Fig. 2 is a perspective sectional view showing the interior of the valve seat, the section being made through the axis of the valve seat. Fig. 3, is a perspective representation of the conical plug, which fits into the valve seat, as detached therefrom. Fig. 4, is an end view of the valve as seen in Fig. 1. Fig. 5 is a vertical section through the valve at right angles to its axis, about midway from either end, showing the relative position of the valve seat and plug, when the steam is being admitted into the cylinders of the steam engine. Fig. 6 is a similar section to Fig. 5, showing the plug in its position, when the steam is shut off from the cylinder.

In the several figures like letters of reference are used to designate similar parts.

My improved valve, which I call an oscillating balance valve, differs from any other cone valves with which I am acquainted, in the peculiar construction of the conical plug, and the corresponding arrangement of the steam ports of the valve seat; and is designed to obviate a serious objection which attends the use of valves which operate by means of a plug inserted in a cylindrical seat, where the plug performs a partial revolution on its axis in the valve seat, arising from the undue degree of friction on certain parts of the valve plug, which cause it to wear away unequally, so that it, as well as the valve seat, soon lose their true cylindrical or conical shape, and thus begin to leak. It also removes another difficulty, caused by the pressure of the steam, first on one side, and then on the other, of the valve plug, which causes it to bind against the valve seat, and creates a great amount of friction and consequent loss of power, and rapid wearing away of both the valve seat and plug, in the uneven manner before described.

My improvement consists in so constructing the valve plug and its seat, as to cause live steam from the boiler to press against both sides of the valve plug from opposite directions toward its axis, at all times when steam is admitted into it, thus causing a perfect balance to the plug, and allowing it to retain its central position in its seat at all times, and equalizing the friction over all parts of its circumference.

Various methods have been tried to effect this object—such, for instance, as loosening the conical valve plug in its seat, just before each stroke, by giving it a slight longitudinal movement, at the same instant that its revolution commences, but so long as the live steam presses only on one side of the plug and the escape steam passes over the other side, there will be a balance of pressure in favor of the side with which the live steam is in contact, which will press the opposite face of the plug against its seat, and cause an undue friction and a binding of the valve, which the loosening of the plug will not avoid, while it causes a constant leak of the steam.

To enable others skilled in the art to make and use my improved steam valve, I will proceed to describe its construction and operation.

In the several figures $a$ $a$ is the valve seat, the interior construction of which is best seen by reference to Fig. 2. Its exterior shape is that of a cylinder, attached to a base or pedestal $b$. In the center or axis of this cylinder, is a cavity of the shape of a frustum of a cone, the diameter at the front end, being slightly greater than at the rear end. This bore or cavity is open at the front end, but does not extend quite through the valve seat at the rear end, (as seen in Fig. 2). The axis of this conical cavity, is coincident with the axis of the cylinder, forming the valve seat $a$ at the rear end of the valve seat. At $c$ (Fig. 2) is the opening through which the live steam enters from the boiler, which opening $c$ communicates with a pipe or gutter $d$ $d$ which forking at $c$ passes around the rear end of the valve seat, parallel to the axis of the cylinder very nearly to the front end of the valve seat. This gutter communicates with the conical bore or cavity, by a long narrow slit $e$ $e'$ on each side of the valve plug. These slits $e$ $e'$ extend nearly the entire length of the valve plug: and are parallel to its axes. The front end of the gutters is closed by the valve casing.

The valve plug, shown in Fig. 3, is of the contour or shape of the frustum of a cone, corresponding in diameter at each end, with the bore of the cavity in the valve seat $a$ and tapering gradually from the front to the rear end. It may be cast in one piece, but to describe accurately its peculiar shape I will speak of it as consisting of several pieces united together as follows: At either end of the plug is a solid disk $f$ $f'$, from the center of each of which projects a journal $g$ to which are attached the rocking arms $r$ $r'$ one on each journal. These journals are not to support the plug in bearings, as it fits snugly in its valve seat, being pressed home by means of a set screw $i$ passing through an arch $k$ fastened to the front of the casing of the valve seat, as seen in Fig. 1. By this set screw, the degree of tightness of the plug in its seat is regulated, and as by my improvement, the valve seat and plug will wear uniformly throughout their circumference in those parts which come in contact with each other, the plug is prevented from working loose, and leaking, by tightening up the set screw $i$. The arm $h$ passes up perpendicularly in front of the valve casing, and the arm $h'$ passes up perpendicularly in a space left between the end of the bore in the valve seat (which is open at both ends) and the inner wall $l$ of the gutter $d$ in the valve seat (see Fig. 2). The arms $h$ $h'$ are connected at top by a cross piece $m$ to which is attached the shaft or valve stem $n$, operated by an eccentric on the engine.

The end disks $f$ $f'$ of the valve plug, are united by two longitudinal plates $p$ $p'$, which are slightly concave on their external faces, are placed parallel to each other, and to the axis of the plug so far apart as to leave a cavity $q$ between them in the center of the plug, as seen in Fig. 5. Each plate $p$ $p'$ has a fin or flange $r$ attached to each side or edge of the plate, extending throughout its whole length. These fins or flanges $r$ $r$, &c., are so situate, as to turn toward the slit $e$ in the steam channels $d$ $d$, thus forming a cavity $s$ $s$ on each side of the valve plug throughout its entire length, except the thickness of the disks $f$, $f'$, at each end. The lower fins or flanges $r$ $r$ are so wide as to cover one, and open the other, of the steam ports $t$, $t'$, when the valve plug is turned (as in Fig. 5) and to close them both when the valve is in the position shown in Fig. 6. This shape of the flanges $r$ $r$ also gives a better bearing of the plug in its seat. The ribs $u$ $u$ shaped in the arc of a circle, serve to strengthen the plates $p$ $p'$ and prevent their being bent, broken or displaced, by the pressure of the steam upon them. The exterior surface of the flange $r$ $r$, the ribs $u$ $u$ and the circumference of the disks $f$ $f'$, is turned smooth, so as to fit closely, and work with as little friction as possible in the valve seat. In the bottom of the valve seat, are the induction steam ports $t$ $t'$, see Figs. 2, 5 and 6, and between them the eduction port $v$, through which the spent steam escapes from the cylinder.

Having thus described the construction of my improved steam valve, I will proceed to explain more fully its use and mode of operation. By the rocking of the arms $h$ $h'$ which are attached to the journals of the valve plug, as before stated, a partial rotation of the plug in its seat is effected, first in one direction, on one stroke of the engine, and then in the other direction, on the return stroke. The position of the valve, shown in Fig. 6, is what I call a vertical position, in which the steam induction ports $t$ $t'$ are both closed, and the eduction port $v$, through which the exhaust steam escapes, is open. When the valve plug is in this vertical position, the live steam from the boiler, entering the valve at $c$ passes around the sides of the valve seat through the channels $d$ $d'$, and enters the cavities $s$ $s'$ on either side of the plug, through the slits $e$ $e$ in the valve seat. As the induction steam ports $t$ $t'$ are both closed by the lower flanges $r$ $r$ of the valve plates $p$ $p'$ (see Fig. 1) the live steam presses horizontally against both the valve plates $p$ and $p'$ in opposite directions, toward the center, and also, presses upward and downward against the flanges $r$ $r$, $r$ $r$, thus removing entirely any inequality of pressure of the valve plug against its seat, and thus leaving it perfectly free to move easily in its seat, and allowing the plug to be seated more closely, than would otherwise be practicable.

On the forward stroke of the valve shaft $n$, the valve plug is turned so that the vertical line through its axis is inclined, as shown in Fig. 5. The live steam which enters through the channel $d$ still presses against the valve plate $p$, but has no escape, while on the opposite side, the live steam entering the cavity $s'$ through the channel $d'$ finds its way through the induction steam port $t'$ into the steam cylinder, the steam port $t'$ having been opened by the passage over it, of the lower flange $r$ of the valve plate $p'$. The live steam also presses against the valve plate $p'$ in the cavity $s'$, thus preserving the balance of pressure. At the same time, the lower flange $r$ of the valve plate $p$ on the other side of the plug, has opened the communication between the eduction port $v$ and the steam port $t$, through the central cavity $q$ of the plug $v$ and this without closing the passage $e$ for the steam into the side cavity of the plug.

The reverse stroke of the engine, causes the plug to turn in the opposite direction, so as to open the steam port *t* to the entrance of the live steam, and connecting the other steam port *t'* and the eduction port *v* with each other, through the central cavity *q* of the plug.

It is thus manifest, that whenever the steam is let on to the valve, whether it is admitted into the steam cylinders of the engine or not, and on both strokes of the engine, the live steam presses against both sides of the plug, thus making a perfect balance valve, and causing the plug and valve seat, to wear away uniformly.

Having thus described my improvement in valves, what I claim as my invention, and desire to secure by Letters Patent, is—

So constructing the plug and seat of cylindrical or conical valves, substantially as herein before described, as that the live steam from the boiler, will press on both sides of the valve plug, while the exhaust steam will pass through a central cavity in the plug, for the purpose of equalizing the pressure of the steam on the plug, so as to prevent the valve wearing unevenly, and to reduce the friction of the plug inside the valve seat.

In testimony whereof, the said GEORGE BURNHAM hath hereunto set his hand in presence of us.

GEORGE BURNHAM.

Witnesses:
MARTIN G. CUSHING,
W. BAKEWELL.